United States Patent [19]
Adachi

[11] Patent Number: 5,521,368
[45] Date of Patent: May 28, 1996

[54] BARCODE SYMBOL READING SYSTEM HAVING FUNCTION FOR DETECTING AND CORRECTING INCLINATION OF BARCODE SYMBOL

[75] Inventor: Yutaka Adachi, Tokyo, Japan

[73] Assignee: Olympus Optical Co., Ltd., Tokyo, Japan

[21] Appl. No.: 289,292

[22] Filed: Aug. 11, 1994

[30] Foreign Application Priority Data

Sep. 22, 1993  [JP]  Japan .................................. 5-263969

[51] Int. Cl.⁶ ................................................. G06K 7/10
[52] U.S. Cl. ........................................ 235/462; 235/463
[58] Field of Search .................................. 235/462, 472, 235/454, 464; 382/12, 44, 48

[56] References Cited

U.S. PATENT DOCUMENTS 5,134,272  7/1992  Tsuchiya et al. ...................... 235/462
5,155,343  10/1992 Chandler et al. ...................... 235/462

FOREIGN PATENT DOCUMENTS

0115166  9/1980  Japan ..................................... 235/462
4-15774  1/1992  Japan ..................................... 235/462
4-13752  3/1992  Japan ..................................... 235/462

*Primary Examiner*—Donald T. Hajec
*Assistant Examiner*—Thien Minh Le
*Attorney, Agent, or Firm*—Frishauf, Holtz, Goodman, Langer & Chick

[57] ABSTRACT

A barcode symbol inclination detection unit detects the inclination angle of a barcode symbol on the basis of image information fetched by an image data fetching unit using, e.g., a linear sensor. A memory read/write control unit directly stores the image information fetched by the image data fetching unit in a memory unit, obliquely reads out the stored information along the detected inclination angle, and supplies readout data to a decoder unit. Alternatively, the memory read/write control unit obliquely writes the image information in the memory unit along the detected inclination angle to obtain information equivalent to that free from the inclination of the barcode symbol, simply reads out the stored information in the alignment direction of bars and spaces of the barcode symbol, and supplies readout data to the decoder unit.

12 Claims, 10 Drawing Sheets

FIG. 3A  PDF417

FIG. 3B  CODE 16K

FIG. 3C  DATA CODA

FIG. 3D  VERICODE

FIG. 3E  CODE 49

FIG. 3F  CODA BLOCK 4 974628 536158
JAN CODE

BARCODE SYMBOL READING SYSTEM HAVING FUNCTION FOR DETECTING AND CORRECTING INCLINATION OF BARCODE SYMBOL

BACKGROUND OF THE INVENTION

1. Field of the Invention

The present invention generally relates to a barcode symbol reading system and, more particularly, to a barcode symbol reading apparatus and method, which are not influenced by the alignment direction (inclination) of a barcode symbol in a barcode symbol reading apparatus for reading a barcode symbol using a sensor such as a linear sensor.

2. Description of the Related Art

Conventionally, various types of barcodes are known, and various barcode reading apparatuses for reading these barcodes have been developed. As one of such barcode symbol reading apparatuses, an apparatus for reading a barcode symbol using a linear sensor is known. Such a barcode symbol reading apparatus using a linear sensor is disclosed in, e.g., Jpn. Pat. Appln. KOKAI Publication No. 4-15774.

Figure 11A:
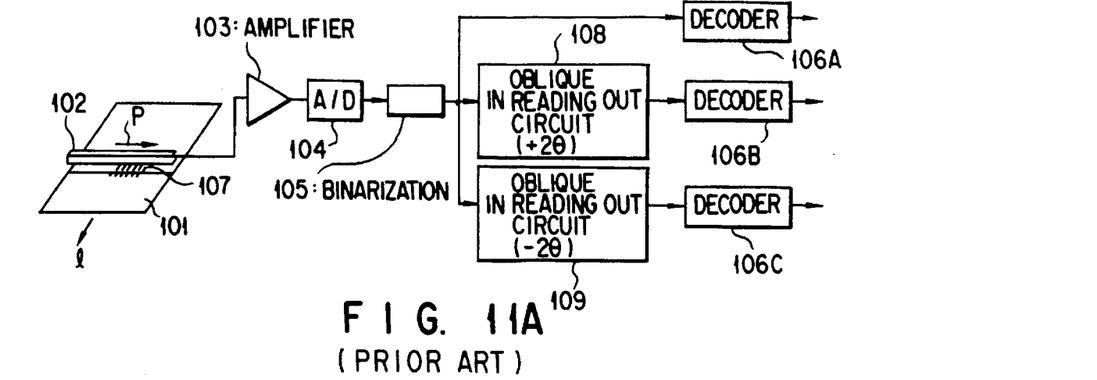
FIG. 11A is a block diagram of a conventional barcode symbol reading apparatus.

As shown in FIG. 11A, a barcode symbol 107 printed on a paper sheet 101 is sequentially scanned by a linear sensor (described as a line sensor in the above-mentioned reference) 102 in the main scanning direction (the direction of an arrow P in FIG. 11A), and the linear sensor 102 is scanned by a convey mechanism (not shown) in the sub-scanning direction (the direction of an arrow l) perpendicular to the main scanning direction simultaneously with the scanning operation in the main scanning direction, thereby two-dimensionally detecting an image of the barcode symbol 107. The output from the linear sensor 102 is supplied to a binarization circuit 105 via an amplifier 103 and an A/D converter 104, and is binarized into values "1" and "0" corresponding to bars and spaces of the barcode symbol 107. A decoder 106A decodes the binary output, and outputs alphanumeric data corresponding to the entire barcode symbol 107.

Figures 11B, 11C, 11D, 11E:
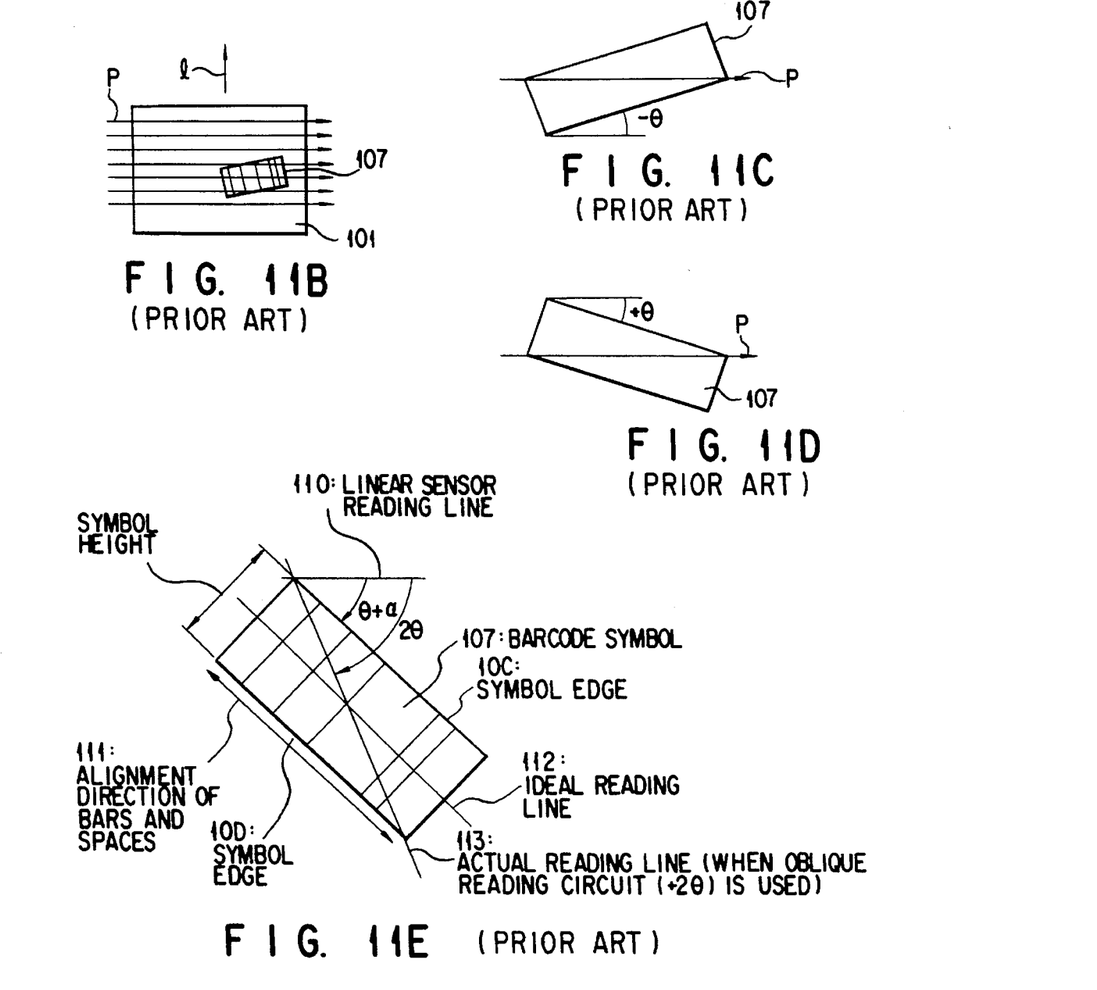
FIG. 11B is a view showing the inclined state of a barcode symbol.
FIGS. 11C and 11D are views showing inclination angles in which the main scanning direction of a linear sensor can scan all bars and spaces of a barcode symbol.
FIG. 11E is a view for explaining the problems of the conventional apparatus.

When the barcode symbol 107 is scanned and read by the line sensor 102, the alignment direction of the bars and spaces of the barcode symbol 107 is often inclined with respect to the main scanning direction (the direction of the arrow P) in practice, as shown in FIG. 11B. In this case, when the main scanning direction of the linear sensor 102 falls outside a range in which all the bars and spaces of the barcode symbol 107 can be scanned, i.e., when the inclination angle of the alignment direction of the barcode symbol 107 exceeds an angle $-\theta$ (FIG. 11C) or $+\theta$ (FIG. 11D), the linear sensor 102 can no longer detect the entire barcode symbol 107. As a result, when the inclination of the barcode symbol is large, the reading operation is disabled.

In the reading apparatus disclosed in the above-mentioned reference, even when the inclination angle falls outside the above-mentioned range defined by $+\theta$ and $-\theta$, if the oblique reading direction coincides with a direction in which all the bars and spaces of the barcode symbol 107 can be scanned, data of the entire barcode symbol 107 can be read from binary data extracted by an oblique reading means. More specifically, when the inclination angle of the barcode symbol falls within a range from $+\theta$ to $+3\theta$, an oblique reading circuit 108 re-constructs the same data string as a binary data string, obtained when the main-scanning operation is performed at an angle $+2\theta$, on the basis of the output from the binarization circuit 105, and supplies the re-constructed data string to a decoder 106B. Similarly, when the inclination angle of the barcode symbol falls within a range from $-\theta$ to $-3\theta$, an oblique reading circuit 109 re-constructs the same data string as a binary data string, obtained when the main-scanning operation is performed at an angle $-2\theta$, on the basis of the output from the binarization circuit 105, and supplies the re-constructed data string to a decoder 106C.

However, as shown in, e.g., FIG. 11E, when the inclination angle of an alignment direction 111 of the bars and spaces of the barcode symbol 107 with respect to the main scanning direction (a linear sensor reading line 110) of the linear sensor 102 is $\theta+\alpha$ (where $\alpha<\theta$, $\theta$ is the angle shown in FIGS. 11C and 11D), an ideal reading line in this case is a line parallel to the alignment direction 111 of the bars and spaces, as denoted by reference numeral 112 in FIG. 11E, but the actual reading line becomes a line denoted by reference numeral 113.

Of course, the barcode symbol can be read along the line 113 in the direction inclined with respect to the alignment direction 111 of the bars and spaces. However, when the barcode symbol is read along the ideal reading line 112, the same barcode symbol 107 can be read along a plurality of lines parallel to the line 112, and reading reliability can be improved. In particular, when the barcode symbol 107 to be read is a high-density two-dimensional barcode symbol, the same barcode symbol is read a plurality of times, thus improving reliability and eliminating reading errors.

However, when the reading line is inclined like the line 113, the number of lines parallel to the line 113 along which the same barcode symbol 107 can be read becomes very small, and reading reliability is impaired. Therefore, it is preferable to read the barcode symbol along the ideal reading line 112.

SUMMARY OF THE INVENTION

It is, therefore, an object of the present invention to provide a new and improved barcode symbol reading system in which a function of detecting and correcting the inclination of a barcode is added, whereby a variable reading angle for an inclined barcode symbol is set in correspondence with its detected inclination to read barcode information by tracing the barcode symbol along an ideal reading line, and high reliability can be assured.

According to one aspect of the present invention, there is provided a barcode symbol reading apparatus comprising: image information fetching means for fetching image information corresponding to a barcode symbol to be read which information is obtained by scanning the barcode symbol in a main scanning direction and a sub-scanning direction perpendicular to the main scanning direction, the main scanning direction substantially providing a predetermined reading direction to the barcode symbol; storage means for performing read/write accesses of the image information fetched by the image information fetching means; inclination angle detection means for detecting an inclination angle of the barcode symbol to be read substantially with respect to the predetermined reading direction; and correction means for correcting a read/write pattern of the image information with respect to the storage means in correspondence with the inclination angle of the barcode symbol to be read, which angle is detected by the inclination angle detection means, thereby enabling reading of barcode symbol information equivalent to information obtained by tracing the barcode symbol to be read in an ideal reading direction substantially in correspondence with the inclination angle of the barcode symbol to be read.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principle of the invention.

DETAILED DESCRIPTION OF THE PREFERRED EMBODIMENTS

Reference will now be made in detail to the presently preferred embodiments of the invention as illustrated in the accompanying drawings, in which like reference characters designate like or corresponding parts throughout the several drawings.

Prior to the description of the preferred embodiments of the present invention, the principle of the present invention will be explained below to help understanding of the present invention.

A barcode symbol reading system of the present invention measures the inclination angle of a barcode symbol, scans read image information at the measured angle, and decodes the scanned information. The barcode symbol reading apparatus of the present invention sequentially scans a barcode symbol in the main scanning direction, and simultaneously scans it in the sub-scanning direction in a direction perpendicular to the main scanning direction, thereby two-dimensionally detecting an image of the barcode symbol.

Figures 1, 2A:
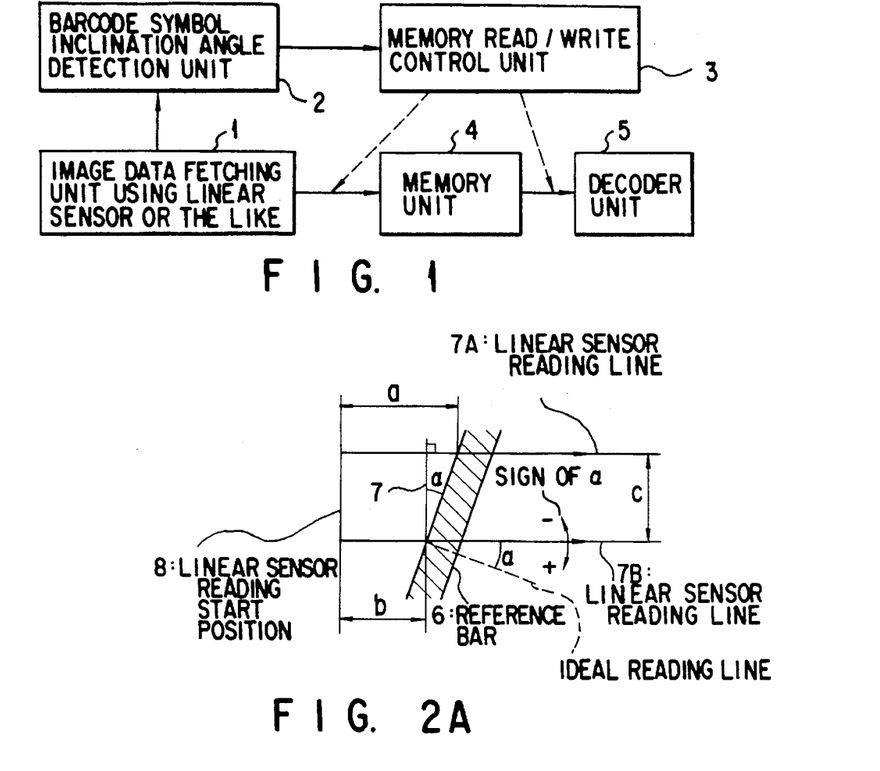
FIG. 1 is a schematic block diagram showing the arrangement of the present invention.
FIGS. 2A and 2B are views for explaining techniques for detecting the inclination angle of a barcode symbol.

FIG. 1 shows the schematic arrangement of the present invention. A barcode symbol inclination angle detection unit 2 detects the inclination angle of a barcode symbol on the basis of image information fetched by an image data fetching unit 1 using, e.g., a linear sensor. As a technique for scanning a barcode symbol at the detected angle, the present invention adopts one of the following two different techniques controlled by a memory read/write control unit 3. More specifically, in one technique, image information fetched by the image data fetching unit 1 is stored in a memory unit 4 without any modifications, and the control unit 3 obliquely reads out the stored information from the memory unit 4 along the inclination angle detected by the inclination angle detection unit and supplies the readout information to a decoder unit 5. In the other technique, the control unit 3 obliquely writes the information in the memory unit 4 along the detected inclination angle to obtain information equivalent to that free from the inclination of the barcode symbol, simply reads out the stored information along the alignment direction of bars and spaces of the barcode symbol, and supplies the readout information to the decoder unit 5.

As the barcode symbol inclination angle detection unit 2, in the present invention, one of a technique commonly using a linear sensor for reading a barcode symbol, and a technique using a pair of sensors exclusively used for inclination angle measurement is adopted.

The technique for measuring the inclination angle of a barcode symbol using a linear sensor for reading a barcode symbol will be described below with reference to FIG. 2A. Note that a bar to be used in the measurement will be referred to as a reference bar 6. As the reference bar 6, any bars in a barcode symbol may be used, but a bar at the leading or trailing end of an array of bars and spaces of the barcode symbol is preferably used for the sake of easy measurement. FIGS. 3A to 3G show examples of reference bars 6 (reference bars 6A at the leading end; last reference bars 6B at the trailing end) in various barcodes. When a barcode symbol does not include any bar which can be used as a reference bar, a new reference bar may be added and used. For example, Jpn. Pat. Appln. No. 4-13752 discloses an example of a barcode symbol obtained by adding a reference bar to a matrix type code.

In the example shown in FIG. 2A, the reference bar 6 is inclined at an angle α with respect to a line 7 perpendicular to reading lines 7A and 7B of the linear sensor. The linear sensor reads image data of such a barcode symbol in the direction of the reading line 7A. In this case, since the entire barcode print surface is read by moving the linear sensor relative to a medium printed with the barcode symbol in a direction perpendicular to the reading line 7A of the linear sensor, the reading line of the linear sensor after an elapse of a given period of time becomes a line parallel to the line 7A and separated therefrom by a distance c, as denoted by reference numeral 7B. In the measurement of the inclination angle of the barcode symbol, the reading lines 7A and 7B, which have the above-mentioned positional relationship therebetween and pass through the reference bar 6, are used.

Whether or not the reading lines pass through the reference bar 6 can be determined by measuring the width of a bar read from the output image signal from the linear sensor, and checking if the measured width coincides with the width, which is known in advance, of the reference bar 6. If no image other than the barcode is printed on a medium printed with the barcode symbol, a first bar read by the linear sensor may be determined to be a reference bar.

Using these reading lines 7A and 7B, two distances between the linear sensor edge (reading start position 8) and the corresponding edge positions of the reference bar 6 are measured. As the measurement method, for example, the number of transfer clocks of the linear sensor from when an output image signal begins to be output from the linear sensor until the reference bar is read may be counted, and the count value may be used.

In FIG. 2A, these two distances are represented by distances a and b. From these numerical values, the inclination angle α of the reference bar 6 with respect to the line 7 perpendicular to the reading lines 7A and 7B of the linear sensor, i.e., the inclination angle α of the barcode symbol is derived as follows:

$$\alpha = \tan^{-1}\{(a-b)/c\} \tag{1}$$

When the reference bar 6 is inclined such that the distance a is smaller than the distance b, a assumes a negative value.

Figure 2B:
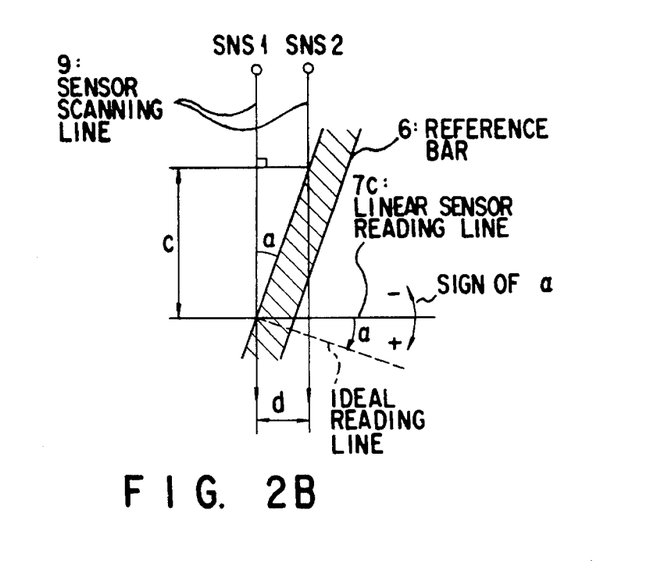
Figure 3A:
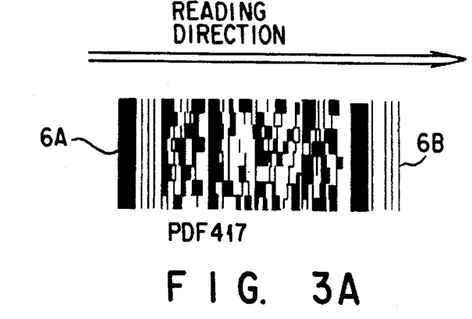
FIGS. 3A to 3G are views showing reference bars in various barcodes.
Figure 3B:
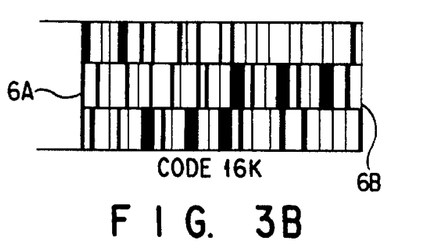
Figure 3C:
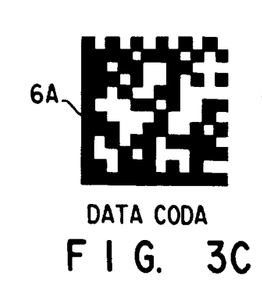
Figure 3D:
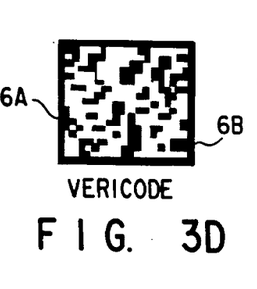
Figure 3E:
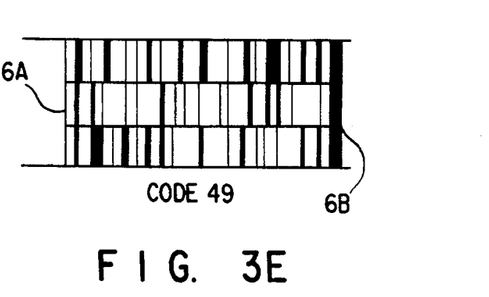
Figure 3F:
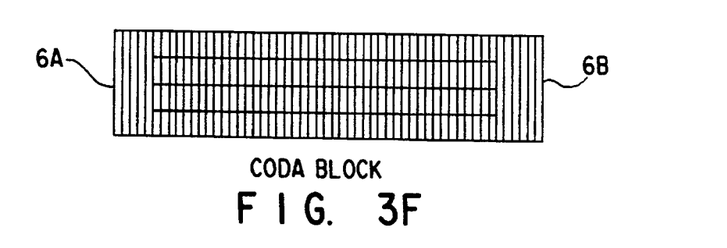
Figure 3G:
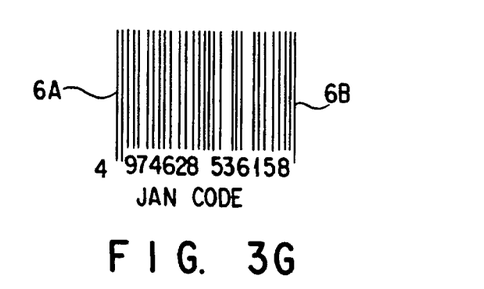

The technique for measuring the inclination angle of a barcode symbol using a pair of sensors exclusively used for inclination angle measurement will be described below with reference to FIG. 2B. In this case, as in FIG. 2A, the pair of sensors exclusively used for inclination angle measurement are moved relative to a medium printed with a barcode symbol in a direction perpendicular to a linear sensor reading line. The pair of sensors exclusively used for inclination angle measurement need only measure the reflection intensity of light within a narrow range of the medium printed with the barcode symbol to determine if the detected portion corresponds to a bar or space. For example, these sensors may comprise a pair of a light-emitting diode and a photodiode. Two or more systems of these sensors are arranged. In FIG. 2B, sensors SNS1 and SNS2 are arranged to be separated from each other by a distance d. When the sensor SNS2 detects the reference bar 6 first, and the sensor SNS1 then detects the reference bar 6, the distance d has a positive sign. Contrary to this, when the sensor SNS1 detects the reference bar 6 first, and the sensor SNS2 then detects the reference bar 6, the distance d has a negative sign. A relative moving distance between the medium printed with the barcode symbol and the sensors SNS1 and SNS2 from when either the sensor SNS1 or SNS2 detects the reference bar 6 first until the other sensor detects the reference bar 6 is represented by c. From these numerical values, the inclination angle α of the reference bar 6 with respect to a linear sensor reading line 7C, i.e., the inclination angle α of the barcode symbol is derived as follows:

$$\alpha = \tan^{-1}(d/c) \tag{2}$$

The reference bar 6 used in the above description is a bar at the leading end of the barcode array, as denoted by reference numeral 6A in each barcode (PDF417, Code 16K, DATA CODA Vericode, Code 49, Code block and JAN code), as shown in FIGS. 3A to 3G. However, when the reference bar 6 is inclined such that the sensor SNS1 detects the reference bar 6 earlier than the sensor SNS2 does, if another bar disturbs detection of the reference bar 6 by the sensors SNS1 and SNS2, a bar at the trailing end of the barcode array may be used as a reference bar, as denoted by reference numeral 6B in each of FIGS. 3A to 3G. At this time, the sensors SNS1 and SNS2 must also be arranged at the side of the reference bar 6B. Furthermore, it is preferable that lines be drawn on, e.g., a table, which places a sheet printed with a barcode symbol thereon, in correspondence with the positions of the sensors SNS1 and SNS2, and instructions be attached to urge a user to place the sheet, so that the reference bar 6 crosses the drawn lines.

when the inclination is detected using the linear sensor, as shown in FIG. 2A, the bar 6B at the trailing end of the barcode array may also be used as the reference bar 6. At this time, the number of transfer clocks of the linear sensor from when the last bar is detected until the end of read data from the linear sensor is counted, and this value can be used as the distances a and b. In this case, equation (1) above is modified as follows to adjust the sign of α:

$$\alpha = -\tan^{-1}\{(a-b)/c\} \tag{1'}$$

Figure 4A:
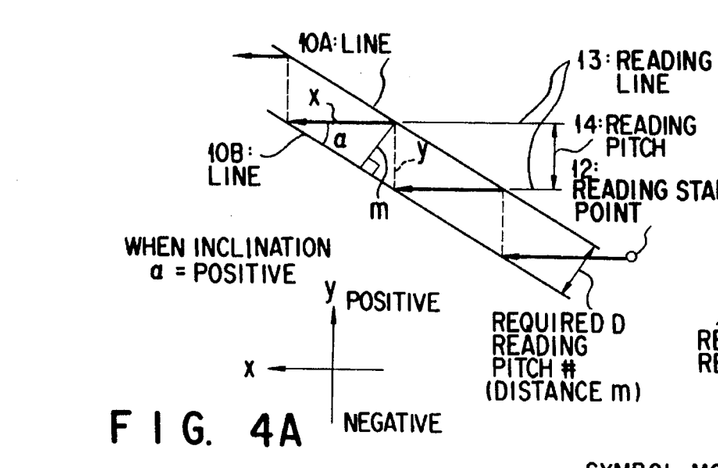
FIGS. 4A and 4B are views for explaining oblique scanning techniques.

The oblique scanning technique by the control unit 3 will be described below with reference to FIGS. 4A and 4B. As the oblique scanning timings, two different techniques are available in the present invention, as described above. In one technique, fetched image information is stored in the memory unit 4 without any modifications, and the stored information is obliquely read out from the memory unit 4 along the detected inclination angle. In the other technique, fetched image information is obliquely written in the memory unit 4 along the detected inclination angle to obtain information equivalent to that free from the inclination of a barcode symbol, and the stored information is simply read out from the memory unit 4 along the alignment direction of bar and spaces of the barcode symbol. In either technique, oblique scanning along the inclination of the barcode symbol must be performed. FIG. 4A shows a case wherein the inclination angle α is positive, and FIG. 4B shows a case wherein the inclination angle α is negative.

Basically, a range sandwiched between lines 10A and 10B is obliquely scanned. These lines 10A and 10B are almost parallel to symbol edges 10C and 10D. The interval between the lines 10A and 10B corresponds to a required reading pitch 11. The reading pitch 11 must be ½ or less of the height of a barcode symbol according to the sampling theorem although it changes depending on the reading resolution of the height of the barcode symbol. Normally, the pitch 11 which is ⅓ or less of the height of the symbol is used in consideration of a margin.

Figure 4B:
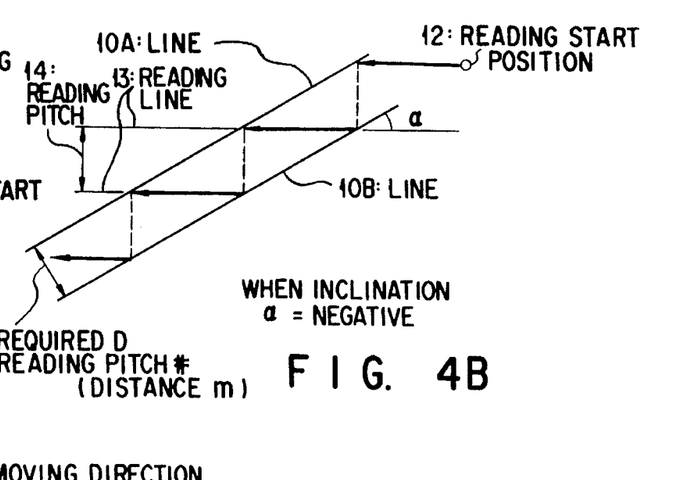

In FIGS. 4A and 4B, image data used in oblique scanning are data on lines indicated by bold arrows. Distances x and y shown in FIGS. 4A and 4B are calculated. After x and y are calculated, if a reading start point 12 is determined, oblique scanning can be realized by tracing image data in accordance with the values x and y. If the reading pitch 11 is represented by m and the inclination is represented by α, these distances x and y are given by:

$$\text{an absolute value of } x = (m/\sin\alpha) \tag{3}$$

$$y = m/\cos\alpha \quad (\text{when } \alpha > 0) \tag{4}$$

$$y = -m/\cos\alpha \quad (\text{when } \alpha < 0) \tag{4'}$$

Although the sign of the value "m/sin α" changes depending on whether α is positive or negative, since the sign has no significance, the absolute value of this value is calculated and is used as x. Upon execution of oblique reading, a reading pitch 14 (distance y) as the interval between reading lines 13 of the linear sensor changes depending on the inclination α. For this reason, the reading pitch 14 must be changed in correspondence with the inclination angle α to become equal to the calculated value y by changing the relative moving speed between a medium printed with a barcode symbol and the linear sensor or by changing the reading interval of the linear sensor even when the moving speed is constant.

The preferred embodiments of the present invention will be described below with reference to the accompanying drawings.

Figure 5A:
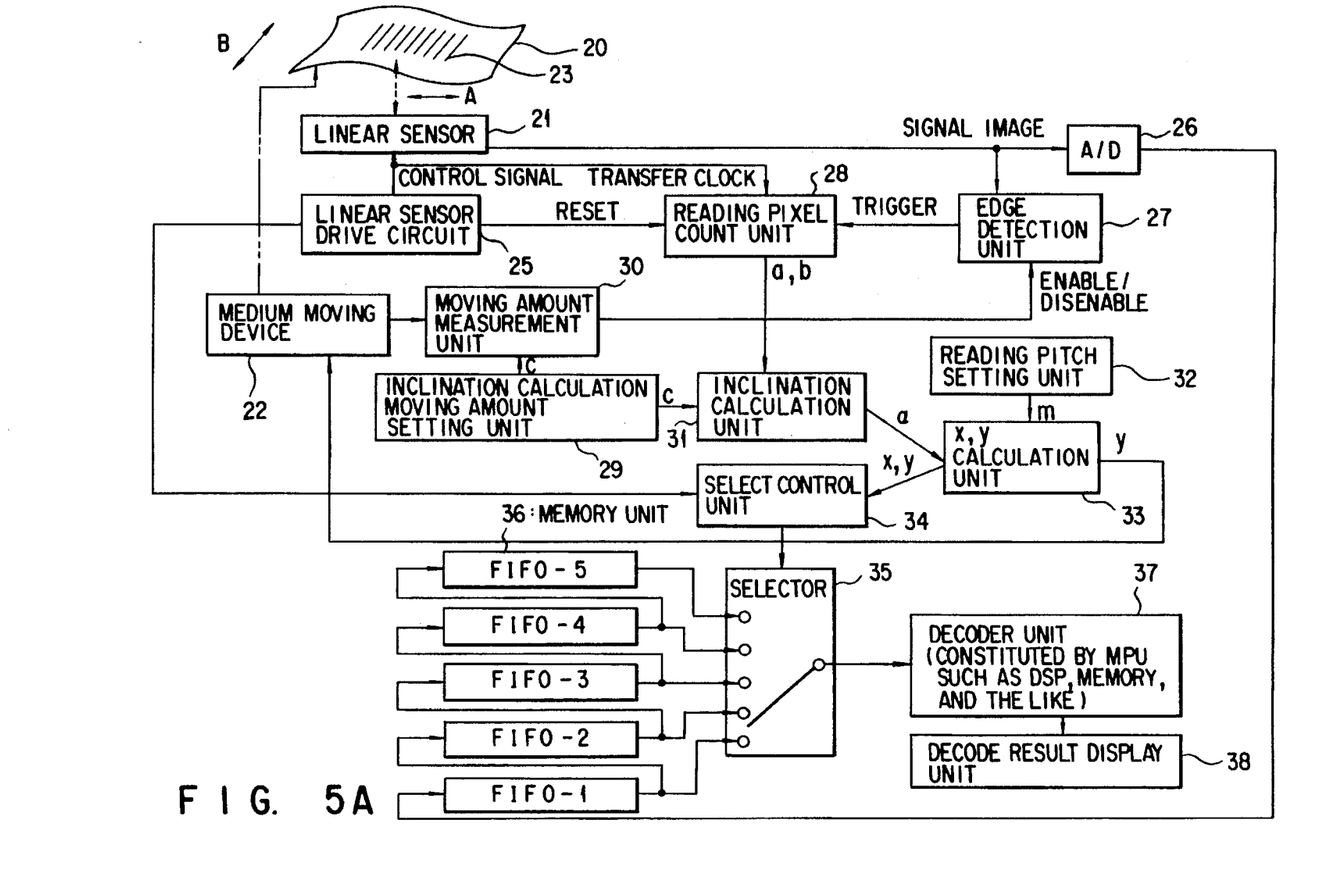
FIG. 5A is a block diagram showing the first embodiment of the present invention.

FIG. 5A is a block diagram showing the first embodiment of a barcode symbol reading apparatus according to the present invention. In this embodiment, the inclination angle of a barcode symbol is measured by the technique commonly using the linear sensor for reading the barcode symbol, as has been described above with reference to FIG. 2A.

Figure 5B:
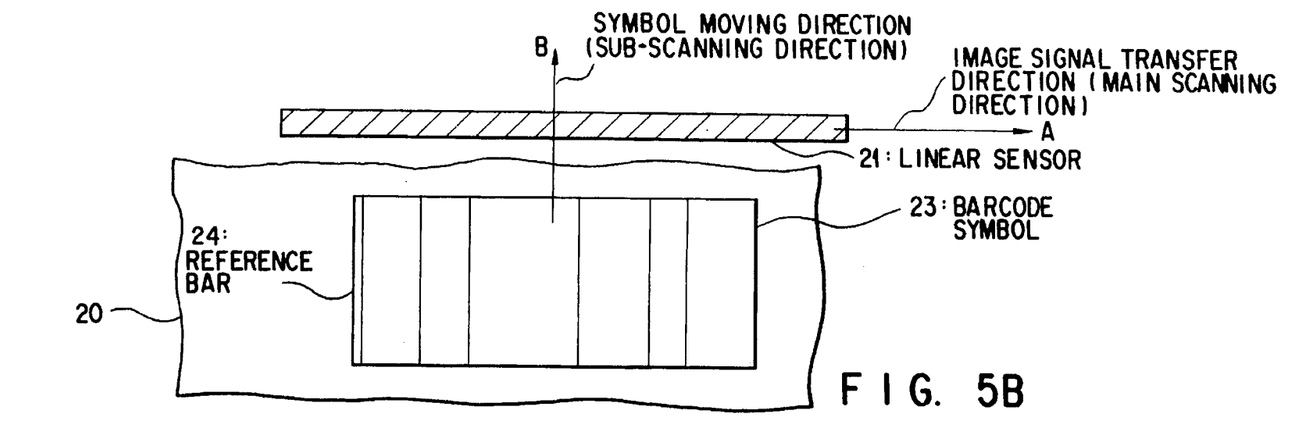
FIG. 5B is a view showing the positional relationship between a linear sensor and a barcode symbol in the first embodiment.

More specifically, a linear sensor 21 is arranged in a direction substantially parallel to the alignment direction of bars and spaces of a barcode symbol 23 formed on a medium 20 so as to scan the barcode symbol 23 in a main scanning direction A. The medium 20 formed with the barcode symbol 23 is moved by a medium moving device 22 in a sub-scanning direction B perpendicular to the main scanning direction A. FIG. 5B shows the positional relationship between the linear sensor 21 and the barcode symbol 23 and the relationship between a reference bar 24 and the symbol moving direction.

The reading cycle, data transfer speed, exposure time, and the like of the linear sensor 21 are set by a linear sensor drive circuit 25, and the linear sensor 21 receives necessary control signals from the circuit 25. An image signal output from the linear sensor 21 is supplied to an analog-to-digital (A/D) converter 26 and an edge detection unit 27. The edge detection unit 27 detects an edge portion of the reference bar 24 from the input image signal. In this embodiment, since the arrangement shown in FIG. 5B is adopted, a bar which appears (detected) first is used as the reference bar 24. Upon detection of the edge of the reference bar 24, the edge detection unit 27 supplies a trigger signal to a reading pixel count unit 28.

The reading pixel count unit 28 receives a reset signal from the linear sensor drive circuit 25 at the beginning of reading of the linear sensor 21. The reading pixel count unit 28 counts the number of transfer clocks in the control signal supplied from the linear sensor drive circuit 25 to the linear sensor 21 during an interval between the reception timings of the reset signal and the trigger signal. The count result provides information of the distance a shown in FIG. 2A.

In this embodiment, the distance c shown in FIG. 2A is set in advance in an inclination calculation moving amount setting unit 29. A moving amount measurement unit 30 compares the moving amount from the medium moving device 22 and the moving amount set in the inclination calculation moving amount setting unit 29. When the linear sensor 21 scans the reference bar 24 and when two amounts have the same value, the unit 30 outputs an enable signal to the edge detection unit 27. This enable signal is also output at the beginning of movement of the medium 20 before the medium 20 is moved at the set moving amount. In a state other than this condition, the moving amount measurement unit 30 outputs a disable signal. The edge detection unit 27 operates for only a 1-line image signal at the time of input of the enable signal from the moving amount measurement unit 30. In this manner, the output from the reading pixel count unit 28 obtained after the medium is moved by the distance c provides information of the distance b shown in FIG. 2A.

An inclination calculation unit 31 receives information of the distances a and b counted by the count unit 28 and the distance c set in the inclination calculation moving amount setting unit 29. The inclination calculation unit 31 calculates the inclination angle α by substituting the input information of the distances a, b, and c in equation (1) or (1)' above.

On the other hand, the required reading pitch m shown in FIGS. 4A and 4B is set in advance in a reading pitch setting unit 32. This value is determined based on the type of a barcode symbol which can be read.

The inclination angle α calculated by the inclination amount calculation unit 31 and the reading pitch m set in advance in the reading pitch setting unit 32 are input to an x,y calculation unit 33. The x,y calculation unit 33 calculates the values x and y shown in FIGS. 4A and 4B by substituting the input m and α in equations (3) and (4) or (4)' above.

The calculated values x and y are input to a select control unit 34. The select control unit 34 uses the input values x and y together with various signals from the linear sensor drive circuit 25 to perform select control of a selector 35. More specifically, the selector 35 selects data from a memory unit 36 so as to obliquely scan the data in accordance with the input values x and y.

In the memory unit 36, in this embodiment, five FIFO (First In First Out) memories are connected in series with each other, as shown in FIG. 5A, and data can be parallelly read out from these memories. Image information converted into digital data by the A/D converter 26 is input to the first one of the five FIFO memories which are connected in series with each other, i.e., to a FIFO-1.

Data write states in the five FIFO memories will be explained below with reference to FIG. 6. Reference numerals 36A to 36F in FIG. 6 time-serially represent the states of data in the FIFO-1 to FIFO-5. Paying attention to a state 36A, boxes in the horizontal direction correspond to data in each FIFO memory. In the state 36A, data are input and transferred from the left end of the FIFO-1 in the order of "F0, E1, D2, C3, B4, A5, ... ". Data which has reached the right end of the FIFO-1 is output from the FIFO-1 to the selector 35, and is also input to the FIFO-2. The state of data in the memory unit 36 changes like the states 36B, 36C, 36D, . . . .

Figure 6:
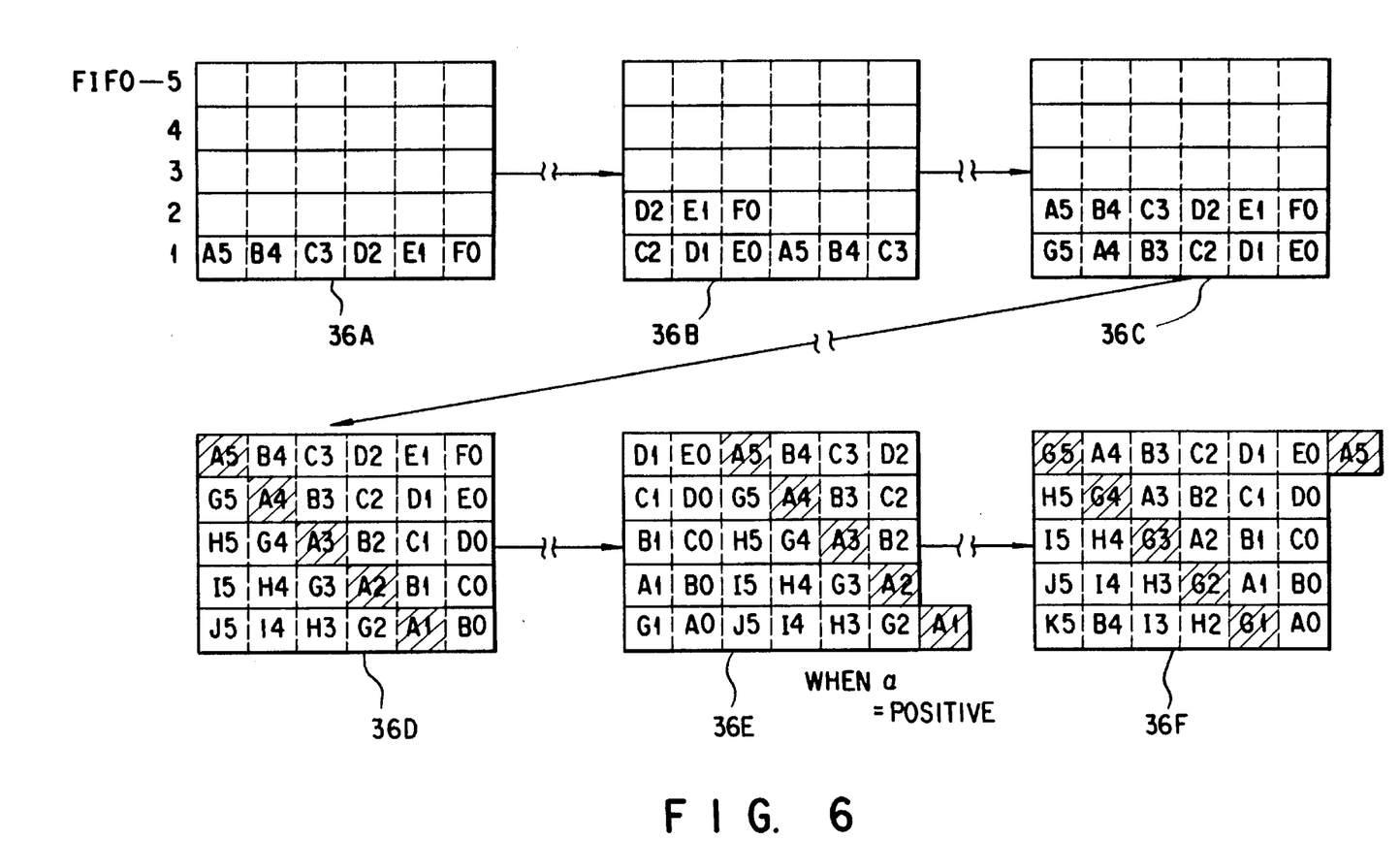
FIG. 6 is a view time-serially showing data write states in FIFO memories constituting a memory unit in the first embodiment when the inclination angle of a barcode symbol is positive.

Note that the description with reference to FIG. 6 is merely an example, and does not accurately explain the operations of actual FIFO memories. In FIG. 6, the five FIFO memories are connected. However, the number of FIFO memories is not limited to this, and may be decreased when the inclination of the barcode symbol is small. Furthermore, the number of data in each FIFO memory is 6 (pixels) in FIG. 6. However, the number of data in each FIFO memory is preferably equal to or larger than the number of pixels of the linear sensor in practice.

In FIG. 6, one box e.g. one grid in a matrix does not always represent only data of one pixel in the linear sensor 21 converted by the A/D converter 26, but often represents data of a plurality of pixels, and assumes that boxes storing identical English letters are data to be obliquely read. Numerical values added to English letters on the boxes represent the image information positions of the barcode symbol read by the linear sensor 21. Assume that "0" indicates right position data in FIG. 5B and "5" indicates left position data in FIG. 5B. More specifically, when the barcode symbol 23 is not inclined, data along the first reading line 13 are input to the FIFO memory in the order of "F0, F1, F2, ..., Fn", and thereafter, data along the next reading line 13, which is offset by the reading pitch 14, are input in the order of "E0, E1, E2, ..., En". Therefore, when data are input in the order of "F0, E1, D2, C3, B4, A5, ...", as shown in FIG. 6, the inclination can be corrected by obliquely reading boxes with identical English letters.

The numerical values x and y are used in selection of data on the memories.

When y is negative, the inclination angle α is negative, and when the memory unit 36 is considered to be a matrix as in FIG. 6 in order to achieve the read operation, as shown in FIG. 4B, data must be read out by scanning the data from the upper right position toward the lower left position. At this time, the read operation is started from the upper right data in the memory unit 36, and after data corresponding to x are read out from a single FIFO memory, the read position is moved downward by y. Then, data corresponding to x are read out from the FIFO memory as a destination. Upon repetition of this operation, oblique scanning toward the lower left position is achieved.

When y is positive, the inclination angle α is positive, and when the memory unit 36 is considered to be a matrix as in FIG. 6 in order to achieve the read operation, as shown in FIG. 4A, data must be read out by scanning the data from the lower right position toward the upper left position. At this time, the read operation is started from the lower right data in the memory unit 36, and after data corresponding to x are read out from a single FIFO memory, the read position is moved upward by y. Then, data corresponding to x are read out from the FIFO memory as a destination. Upon repetition of this operation, oblique scanning toward the upper left position is achieved.

In this embodiment, as shown in FIG. 5A, the value y from the x,y calculation unit 33 is fed back to the medium moving device 22. The medium moving device 22 controls the medium moving speed after detection of the inclination angle so that the distance c between reading lines 13 of the linear sensor 21 becomes equal to y. Thus, when data corresponding to x are read out from a single FIFO memory, the read position is moved upward or downward by y, and data corresponding to x are read out from the FIFO memory as a destination, the read position can be moved to a FIFO memory immediately above or below the current FIFO memory. Thus, the number of FIFO memories can be decreased.

If the value y is not fed back to the medium moving device 22 unlike in this embodiment, and the medium is always moved at a constant speed, in consideration of the medium moving speed and the time interval between reading lines fetched by the linear sensor, when data corresponding to x are read out from a single FIFO memory, the read position is moved upward or downward by y, and data corresponding to x are read out from the FIFO memory as a destination, some FIFO memories may be skipped.

In the example shown in FIG. 6, since the inclination angle α is positive, data must be read out by executing oblique scanning toward the upper left position of the memory. In a state 36E in FIG. 6, the selector 35 operates to select data from the FIFO-1, and transfers data "A1" to the decoder unit 37. In the next stage of the state 36E in FIG. 6, since data "A2" is output from the FIFO-2, the selector 35 selects the output from the FIFO-2. In a state 36F in FIG. 6, data "A5" is output from the FIFO-5, and at this time, the selector 35 operates to select the data from the FIFO-5. As described above, tracing of data "An" ends. Thereafter, the above-mentioned operation is repeated to obliquely scan data "Gn", data "Hn", data "In", ... in turn in FIG. 6.

Figure 7:
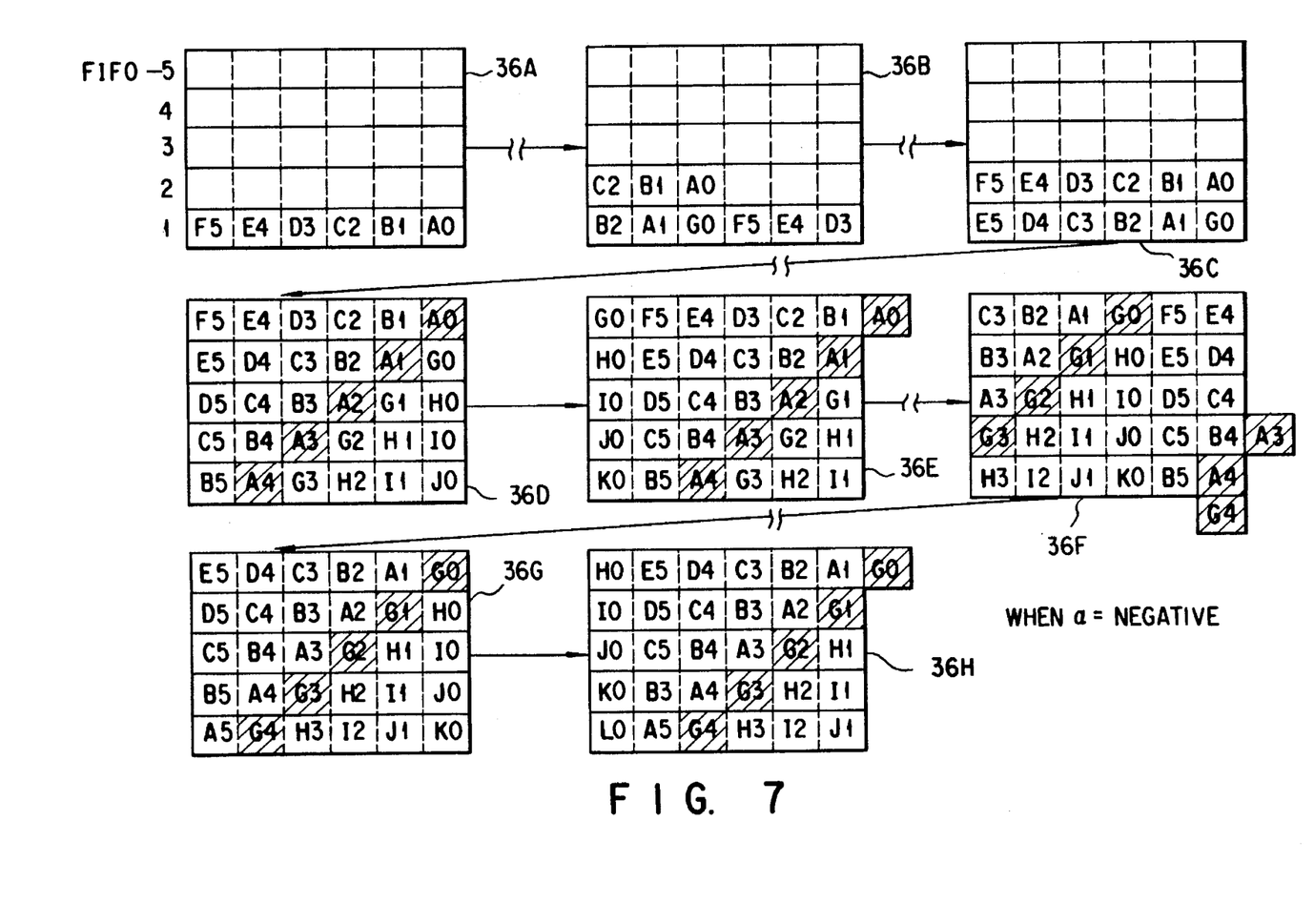
FIG. 7 is a view time-serially showing data write states in the FIFO memories constituting the memory unit in the first embodiment when the inclination angle of a barcode symbol is negative.

FIG. 7 shows the memory contents of the FIFO-1 to FIFO-5 when the inclination angle α is negative, in the same manner as in FIG. 6. English letters and numerals in FIG. 7 have the same meanings as those in FIG. 6.

In a state 36E in FIG. 7, the selector 35 selects the FIFO-5 to send data "A0" to a decoder unit 37. In correspondence with transferred data, the selector 35 selects the FIFO-4, FIFO-3, FIFO-2, ... in turn to send data "A1", "A2", "A3", ... to the decoder unit 37. Upon completion of transfer of data "An", the selector 35 transfers data "Gn" in the same manner as "An". In a state 36H in FIG. 7, the selector 35 selects the FIFO-5 to send data "G0" to the decoder unit 37. In this manner, the same operation is repeated.

The decoder unit 37 normally comprises a microprocessor unit (MPU) such as a digital signal processor (DSP), and decodes encoded barcode information. Some barcode symbol reading apparatuses do not have the decoder unit 37, and a host computer or the like connected to the reading apparatus performs the operation of the decoder unit 37. The decode result is supplied to a decode result display unit 38, and is, e.g., displayed for an operator.

Figure 8:
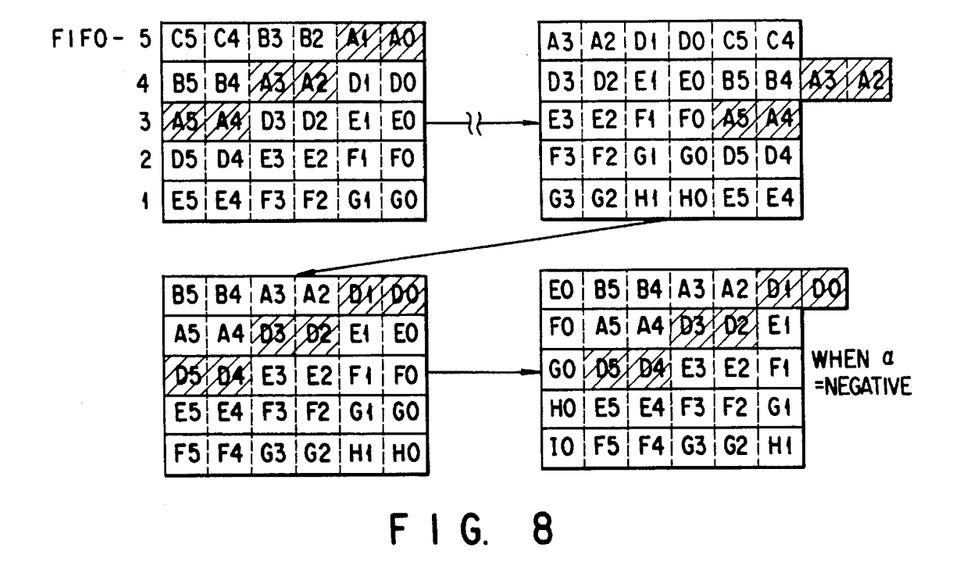
FIG. 8 is a view time-serially showing data write states when the inclination angle of a barcode symbol is smaller than that in FIG. 7.

FIG. 8 shows the memory contents of the FIFO-1 to FIFO-5 when the inclination angle ° is negative and is smaller than that in FIG. 7, in the same manner as in FIG. 7. As can be seen from FIG. 7, the FIFO-5, FIFO-4, and FIFO-3 of the memory unit 36 are used in this case.

Figure 9:
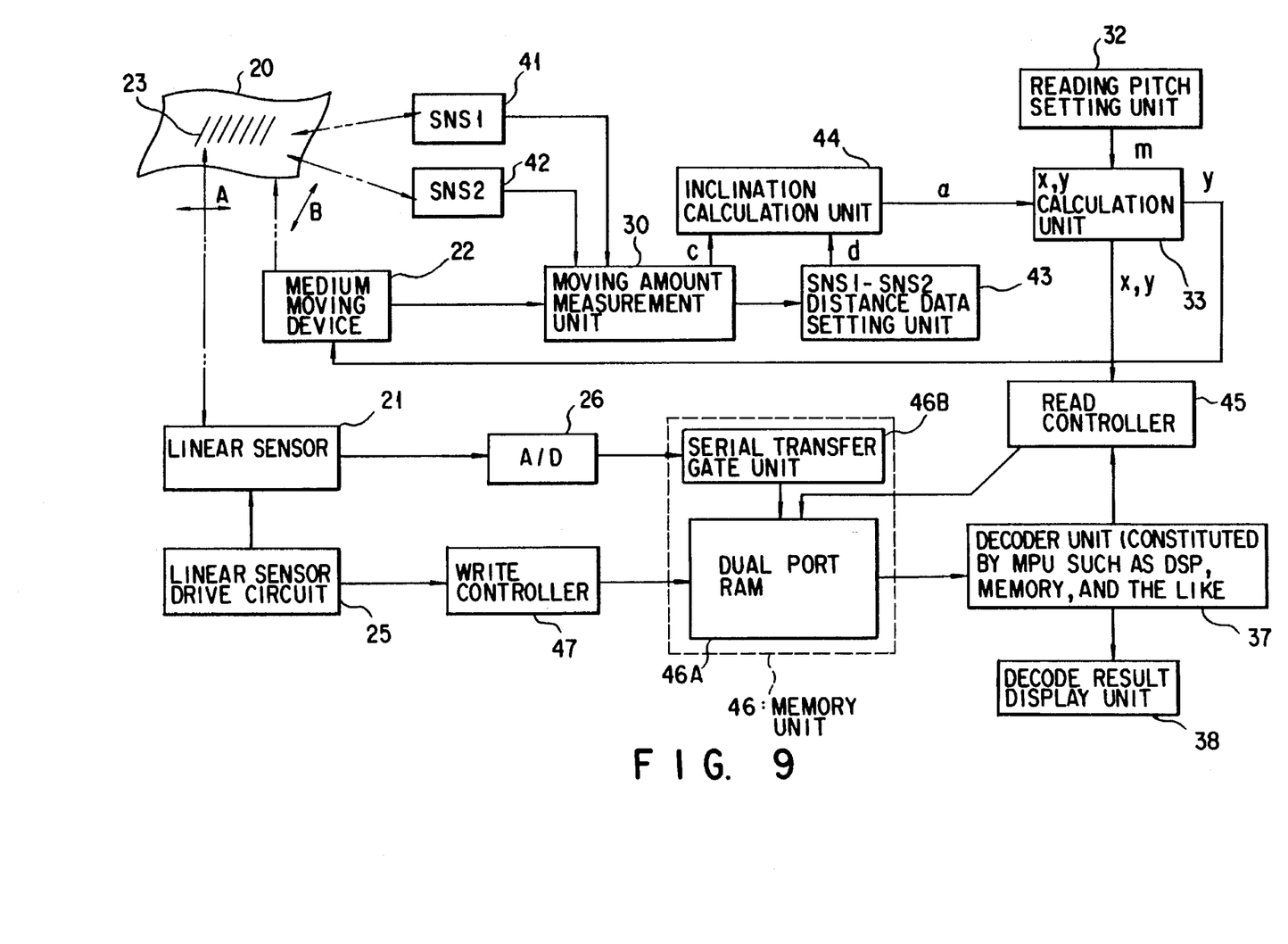
FIG. 9 is a block diagram showing the second embodiment of the present invention.

FIG. 9 is a block diagram showing the second embodiment of the present invention. In this embodiment, the inclination angle of a barcode symbol is measured by the technique using a pair of sensors exclusively used for inclination angle measurement, as has been described above with reference to FIG. 2B. Note that the same reference numerals in FIG. 9 denote the same parts as in FIG. 5, and a detailed description thereof will be omitted.

In the second embodiment, the moving distance of a medium from when one of a sensor (SNS1) 41 and a sensor (SNS2) 42 detects the edge of a reference bar 6 until the other sensor detects the edge of the reference bar is used as the distance c. In this embodiment, the medium is moved. Alternatively, the sensor (SNS1) 41 and the sensor (SNS2) 42 may be moved in a direction perpendicular to the reading direction of the linear sensor 21, and this moving distance may be measured and used as the distance c.

As shown in FIG. 2B, the distance d between the sensor (SNS1) 41 and the sensor (SNS2) 42 is known, and is stored in an SNS1-SNS2 distance data setting unit 43. The distance is input from the SNS1-SNS2 distance data setting unit 43 to an inclination amount calculation unit 44. The inclination amount calculation unit 44 substitutes the distances c and d in equation (2) above to obtain the inclination angle α. The value α is input to the x,y calculation unit 33. The x,y calculation unit 33 substitutes the reading pitch m and the inclination angle α in equations (3) and (4) or (4)' above to calculate the values x and y, as shown in FIGS. 4A and 4B. The calculated values x and y are input to a read controller 45. The read controller 45 includes an address control unit, and the like, and controls read accesses of data from a memory unit 46.

Prior to the description of the read access from the memory unit 46, the write access to the memory unit 46 will be explained below. The memory unit 46 comprises a dual port random-access memory (RAM) 46A. The dual port RAM 46A is a kind of element constituting a frame memory, but is largely different from a conventional frame memory using a static random-access memory (SRAM) since it can serially input/output data. Serially input data is temporarily stored in a serial transfer gate 46B. After data for one line are stored, the stored data are simultaneously transferred to a frame memory unit comprising the dual port RAM 46A. Such a dual port RAM is suitable for the case of this embodiment. Of course, in place of the dual port RAM, a frame memory may be constituted using an SRAM, a dynamic random-access memory (DRAM), or the like.

A signal read from the linear sensor 21 driven by the linear sensor drive circuit 25 is converted into a digital amount by the A/D converter 26, and the digital signal is input to the memory unit 46. This input operation is controlled by a write controller 47 including an address control unit and the like. The write controller 47 is used for simply writing data read by the linear sensor 21 on the frame memory in units of lines without changing the order of data.

Data written in the memory unit 46 are obliquely read out by the read controller 45, and are input to the decoder unit 37. The scanning technique for the oblique read operation is realized using the values x and y as in the first embodiment. However, the oblique read operation in this case is not limited to the directions of bold arrows in FIGS. 4A and 4B since no FIFO memories are used, and may be performed in the reverse direction. The readout data are decoded by the decoder unit 37, and the decode result is displayed by the decode result display unit 38.

Figure 10A:
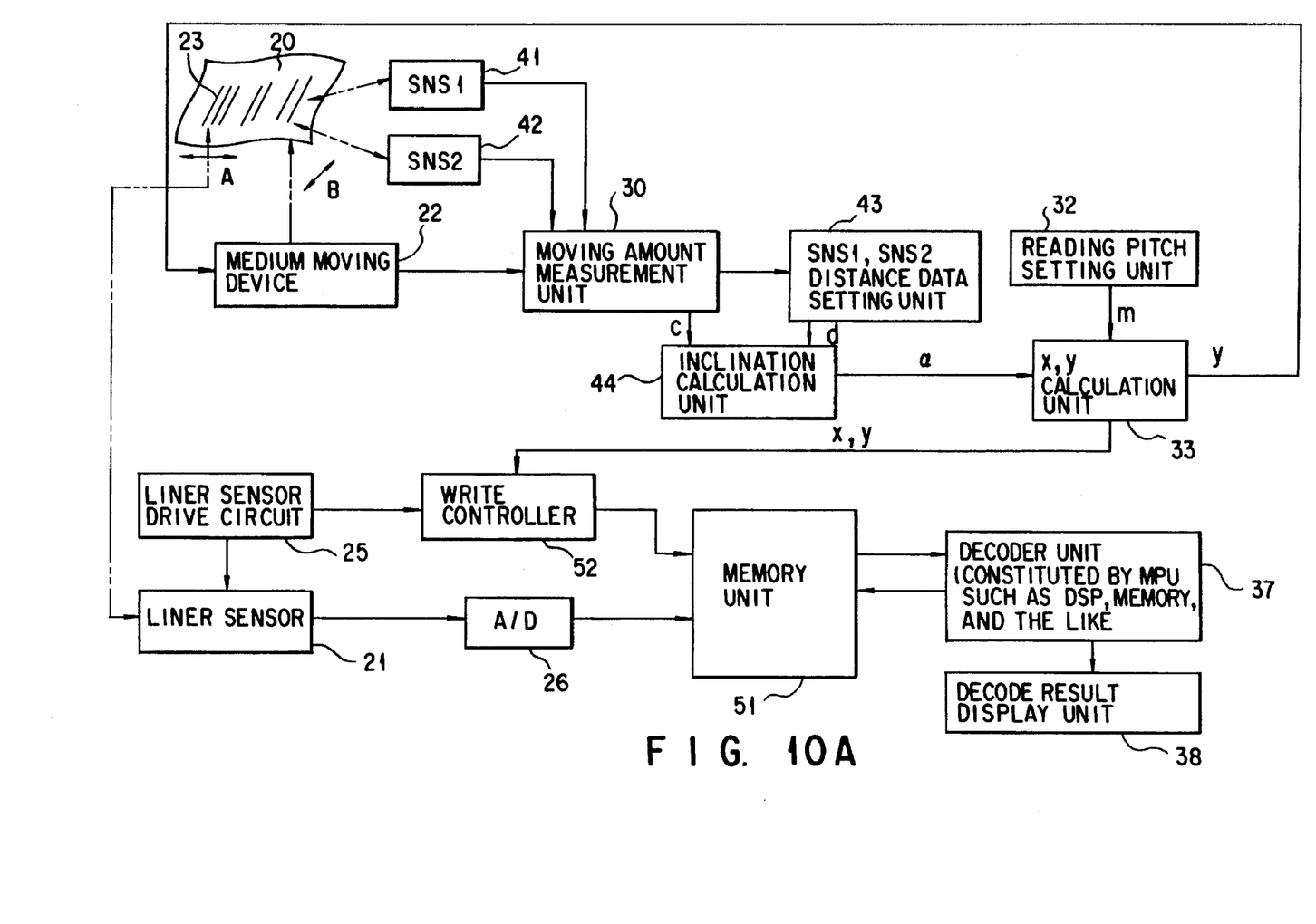
FIG. 10A is a block diagram showing the third embodiment of the present invention.

The third embodiment of the present invention will be described below with reference to FIG. 10A. Note that the same reference numerals in FIG. 10A denote the same parts as in FIG. 9, and a detailed description thereof will be omitted. The difference between the third and second embodiment is that the second embodiment performs oblique scanning when data are read out from the memory unit 46, while the third embodiment performs oblique scanning when data are written in a memory unit 51, and reads out data from the memory unit 51 without executing oblique scanning. Therefore, the write controller 47 in FIG. 9 simply writes data from the linear sensor 21 in the memory unit 46 without changing the order of data. However, in this embodiment, a write controller 52 including an address control unit, and the like obliquely writes data in the memory unit 51 in correspondence with the inclination angle α.

Figure 10B:
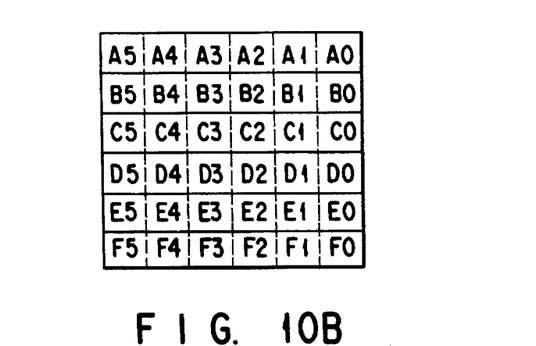
FIG. 10B illustrates a state of data written in a memory unit in the third embodiment of the present invention.

FIG. 10B illustrates the state of data written in the memory unit 51. As shown in FIG. 10B, data in the alignment direction of bars and spaces of the barcode symbol 23 are re-ordered and stored in the horizontal direction of the 6 (lines)×6 (pixels) memory unit 51. The memory unit 51 may comprise a frame memory using an SRAM, a DRAM, or the like.

The stored data are read out from the memory unit 51 in the horizontal direction in units of lines of the memory unit 51 without executing the oblique read operation. For example, in FIG. 10B, after data train "An" is read out, data trains "Bn", "Cn", . . . are read out in turn. The readout data trains are decoded by the decoder unit 37 as in the second embodiment, and a decode result is displayed on the decode result display unit 38.

In each of the first to third embodiments described above, the linear sensor 21 is used for reading the barcode symbol 23. However, the present invention is not limited to this. For example, an element such as a photodiode which can read image information within a small circle may be used. In this case, since the photodiode is moved in the alignment direction of the bars and spaces of the barcode symbol 23 to read image information of the barcode symbol 23, the read information can be used in place of the output signal from the linear sensor 21. Also, when the barcode symbol 23 is read by scanning a laser spot like a laser scanner, a signal obtained based on reflected light from the beam spot can be used in place of the linear sensor 21. Furthermore, an area sensor may be used in place of the linear sensor 21. When the area sensor is used, relative movement between the reading sensor and the medium printed with a barcode need not be performed.

The present invention is not limited to the specific combinations of inclination angle detection means and the types of memories in the above embodiments.

Note that the type of the barcode symbol 23 to be read may be either a linear barcode represented by a JAN code or a two-dimensional barcode represented by a PDF417 barcode as shown in FIGS. 3A to 3G. These barcodes may be invisible ones which cannot be recognized by man unless infrared rays, ultraviolet rays, or the like are used.

Furthermore, the inclination detection of the barcode symbol 23 need only be performed once at the beginning of reading. However, when the inclination of the medium gradually changes during convey of the medium, the inclination detection may be performed at a proper time interval, and the oblique scanning may be corrected.

In each of the above embodiments, the medium printed with the barcode symbol 23 is moved by the medium moving device 22. However, the present invention is not limited to this. For example, the linear sensor may be moved, or both the medium and the linear sensor may be moved. Furthermore, in a case other than the automatic convey mechanism using the moving device or the like is used, for example, in a system wherein the barcode symbol 23 is printed on a card-like medium, and an operator manually moves the card-like medium to scan the barcode symbol 23, the present invention can also be applied to such a system.

As described above, a barcode reading system which can read barcode information by executing oblique scanning along an inclination angle even when a barcode symbol is inclined with respect to the reading direction can be provided.

As described above, according to the present invention, a barcode symbol reading system, which can set a variable reading angle, and can read barcode information by tracing a barcode symbol along an ideal reading line, can be provided.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A barcode symbol reading apparatus comprising:

image information fetching means for fetching image information corresponding to a barcode symbol to be read, which image information is obtained by scanning the barcode symbol in a main scanning direction and a sub-scanning direction perpendicular to the main scanning direction, the main scanning direction substantially providing a predetermined reading direction to the barcode symbol, said image information fetching means comprising a linear sensor for scanning the barcode symbol to be read in the main scanning direction;

storage means for performing read/write accesses of the image information fetched by said image information fetching means;

inclination angle detection means for detecting an inclination angle of the barcode symbol to be read substantially with respect to the predetermined reading direction by commonly using said linear sensor;

said storage means having a minimum memory capacity required for detecting the inclination angle of the barcode symbol; and correction means for correcting a read/write pattern of the image information with respect to said storage means in correspondence with the inclination angle of the barcode symbol to be read, which inclination angle is detected by said inclination angle detection means, thereby enabling reading of barcode symbol information equivalent to information obtained by tracing the barcode symbol to be read in an ideal reading direction substantially in correspondence with the inclination angle of the barcode symbol to be read.

2. An apparatus according to claim 1, further comprising:

relative moving means for moving a medium formed with the barcode symbol to be read relative to said linear sensor.

3. An apparatus according to claim 1, wherein said correction means comprises means for directly writing the image information fetched by said image information fetching means in said storage means, and for obliquely reading out the written image information in correspondence with the inclination angle of the barcode symbol to be read, which inclination angle is detected by said inclination angle detection means.

4. An apparatus according to claim 1, wherein said correction means comprises means for obliquely writing the image information fetched by said image information fetching means in said storage means in correspondence with the inclination angle of the barcode symbol to be read, which inclination angle is detected by said inclination angle detection means, and for directly reading out the written image information from said storage means.

5. A barcode symbol reading apparatus comprising:

image information fetching means for fetching image information corresponding to a barcode symbol to be read, which image information is obtained by scanning the barcode symbol in a main scanning direction and a sub-scanning direction perpendicular to the main scanning direction, the main scanning direction substantially providing a predetermined reading direction to the barcode symbol, said image information fetching means comprising a linear sensor for scanning the barcode symbol to be read in the main scanning direction;

storage means for performing read/write accesses of the image information fetched by said image information fetching means;

inclination angle detection means for detecting an inclination angle of the barcode symbol to be read substantially with respect to the predetermined reading direction by using a pair of sensors exclusively used for inclination angle measurement, which pair of sensors are provided in addition to said linear sensor; and correction means for correcting a read/write pattern of the image information with respect to said storage means in correspondence with the inclination angle of the barcode symbol to be read, which inclination angle is detected by said inclination angle detection means, thereby enabling reading of barcode symbol information equivalent to information obtained by tracing the barcode symbol to be read in an ideal reading direction substantially in correspondence with the inclination angle of the barcode symbol to be read.

6. A barcode symbol reading apparatus comprising:

medium moving means for moving a medium formed with a barcode symbol to be read, which symbol includes a plurality of bars and spaces aligned in a predetermined direction, in a direction perpendicular to the predetermined direction, and outputting a moving amount of the medium;

moving amount measuring means for outputting an enable signal only when the movement of the medium is started by said medium moving means, and when the moving amount output from said medium moving means coincides with a predetermined moving amount setting value c;

a linear sensor, having a plurality of reading pixels aligned in a direction substantially parallel to the predetermined direction, for reading the barcode symbol to be read formed on the medium moved by said medium moving means in units of reading lines, and outputting corresponding image signals;

linear sensor drive means for outputting a predetermined control signal including a reset signal and a transfer clock signal so as to drive said linear sensor;

edge detection means for detecting an edge of a reference bar of the barcode symbol to be read on the basis of the image signals output from said linear sensor driven by said linear sensor drive means while said moving amount measuring means outputs the enable signal, and outputting a trigger signal;

reading pixel count means for counting the number of transfer clocks output from said linear sensor drive means during an interval between reception timings of the reset signal output from said linear sensor drive means and the trigger signal output from said edge detection means, and detecting the number of reading pixels by said linear sensor, whereby said reading pixel count means outputs a first distance value a and a second distance value b which values respectively represent distances from a read start position of said linear sensor until a first reading line and a second reading line respectively reach the reference bar of the barcode symbol to be read;

inclination amount calculation means for calculating an inclination angle $\alpha$ of the barcode symbol to be read using the following equation on the basis of the first distance value a and the second distance value b output from said reading pixel count means and the predetermined moving amount setting value c;

$$\alpha = \pm \tan^{-1}\{(a-b)/c\}$$

oblique scanning value calculation means for calculating distance values x and y required for oblique scanning using the following equations on the basis of the inclination angle $\alpha$ calculated by said inclination amount calculation means, and a reading pitch m which is predetermined in correspondence with the barcode symbol to be read;

an absolute value of $x = (m/\sin \alpha)$ and $y = m/\cos \alpha$ (when $\alpha > 0$) or $y = -m/\cos \alpha$ (when $\alpha < 0$)

A/D conversion means for converting the image signal read by said linear sensor into digital data;

storage means for storing the digital data converted by said A/D conversion means in a substantially two-dimensionally mapping format; and oblique scanning means for selectively reading out the digital data, stored in said storage means in substantially the two-dimensionally mapping format, by obliquely scanning the digital data on the basis of the distance values x and y required for oblique scanning calculated by said oblique scanning value calculation means and the predetermined control signal output from said linear sensor drive means.

7. An apparatus according to claim 6, further comprising:

feedback means for controlling the predetermined moving amount setting value c, which provides a distance value of each reading line of said linear sensor, to become equal to the distance value y required for oblique scanning by feeding back the distance value y required for oblique scanning calculated by said oblique scanning value calculation means to said medium moving means.

8. An apparatus according to claim 6, wherein said storage means comprises a plurality of First In First Out memories which are connected in series with each other, and can parallelly output data.

9. A barcode symbol reading apparatus comprising:

medium moving means for moving a medium formed with a barcode symbol to be read, which symbol includes a plurality of bars and spaces aligned in a predetermined direction, in a direction perpendicular to the predetermined direction;

a pair of sensors which are exclusively used for inclination angle measurement of the barcode symbol to be read, and are arranged to be separated from each other by a distance value d so as to detect an edge of a reference bar of the barcode symbol to be read;

moving amount measuring means for measuring a moving amount c of the medium by said medium moving means on the basis of edge detection signals from said pair of sensors;

a linear sensor, having a plurality of reading pixels aligned in a direction substantially parallel to the predetermined direction, for reading the barcode symbol to be read formed on the medium moved by said medium moving means in units of reading lines, and out-putting corresponding image signals;

linear sensor drive means for outputting a predetermined control signal so as to drive said linear sensor;

inclination amount calculation means for calculating an inclination angle α of the barcode symbol to be read using the following equation on the basis of the moving amount measured by said moving amount measuring means and the predetermined distance value d;

$\alpha = \pm \tan^{-1}(d/c)$ oblique scanning value calculation means for calculating distance values x and y required for oblique scanning using the following equations on the basis of the inclination angle α calculated by said inclination amount calculation means, and a reading pitch m which is predetermined in correspondence with the barcode symbol to be read;

an absolute value of x=(m/sin α) and y=m/cos α (when α>0) or y=−m/cos α (when α<0)

A/D conversion means for converting the image signal read by said linear sensor into digital data;

storage means for storing the digital data converted by said A/D conversion means in a substantially two-dimensionally mapping format; and oblique scanning means for selectively reading out the digital data, stored in said storage means in substantially the two-dimensionally mapping format, by obliquely scanning the digital data on the basis of the distance values x and y required for oblique scanning calculated by said oblique scanning value calculation means.

10. An apparatus according to claim 9, wherein said storage means comprises a frame memory.

11. An apparatus according to claim 10, wherein said frame memory comprises a transfer gate for serially and temporarily storing the digital data for one line converted by said A/D conversion means, and a dual port random-access memory to which the data for one line are simultaneously transferred from said transfer gate.

12. A barcode symbol reading apparatus comprising:

medium moving means for moving a medium formed with a barcode symbol to be read, which symbol includes a plurality of bars and spaces aligned in a predetermined direction, in a direction perpendicular to the predetermined direction;

a pair of sensors which are exclusively used for inclination angle measurement of the barcode symbol to be read, and are arranged to be separated from each other by a distance value d so as to detect an edge of a reference bar of the barcode symbol to be read;

moving amount measuring means for measuring a moving amount c of the medium by said medium moving means on the basis of edge detection signals from said pair of sensors;

a linear sensor, having a plurality of reading pixels aligned in a direction substantially parallel to the predetermined direction, for reading the barcode symbol to be read formed on the medium moved by said medium moving means in units of reading lines, and outputting corresponding image signals;

linear sensor drive means for outputting a predetermined control signal so as to drive said linear sensor;

inclination amount calculation means for calculating an inclination angle α of the barcode symbol to be read using the following equation on the basis of the moving amount measured by said moving amount measuring means and the predetermined distance value d;

$\alpha a = \pm \tan^{-1}(d/c)$ oblique scanning value calculation means for calculating distance values x and y required for oblique scanning using the following equations on the basis of the inclination angle α calculated by said inclination amount calculation means, and a reading pitch m which is predetermined in correspondence with the barcode symbol to be read;

an absolute value of x=(m/sin α) and y=m/cos α (when α>0) or y=−m/cos α (when α<0)

A/D conversion means for converting the image signal read by said linear sensor into digital data;

storage means for storing the digital data converted by said A/D conversion means in a substantially two-dimensionally mapping format; oblique scanning means for, when the digital data are written in said storage means, storing the digital data in substantially the two-dimensionally mapping format by executing oblique scanning on the basis of the distance values x and y required for oblique scanning calculated by said oblique scanning value calculation means; and reading means for reading out the digital data from said storage means in the order of storage by the oblique scanning.

* * * * *

UNITED STATES PATENT AND TRADEMARK OFFICE
CERTIFICATE OF CORRECTION

PATENT NO. : 5,521,368
DATED : May 28, 1996
INVENTOR(S) : Yutaka ADACHI

It is certified that error appears in the above-indentified patent and that said Letters Patent is hereby corrected as shown below:

Title page, Item [30] under "Foreign Application Priority Data"

"5-263969" should be --5-236969--

Signed and Sealed this

First Day of July, 1997

Attest:

BRUCE LEHMAN

Attesting Officer

Commissioner of Patents and Trademarks